Figure 1:
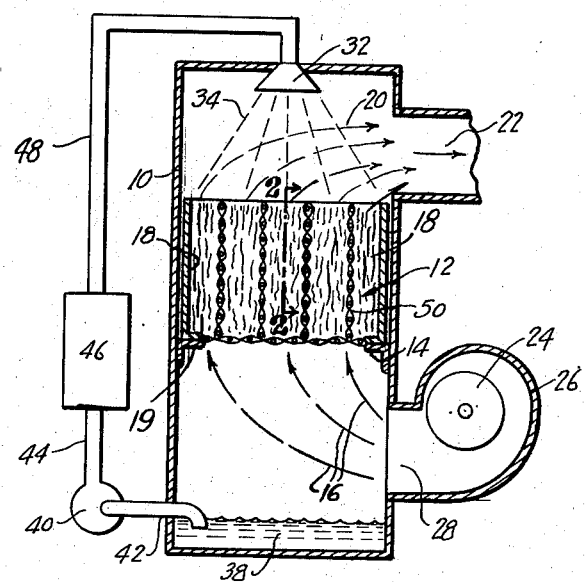

Oct. 12, 1937.　　　F. R. BICHOWSKY　　　2,095,539
GAS AND LIQUID CONTACT APPARATUS
Filed Nov. 21, 1935

INVENTOR
F. R. Bichowsky,
BY Charles A. Lind
ATTORNEY

Patented Oct. 12, 1937

2,095,539

UNITED STATES PATENT OFFICE 2,095,539

GAS AND LIQUID CONTACT APPARATUS

Francis R. Bichowsky, Ottawa Hills, Ohio

Application November 21, 1935, Serial No. 50,826

1 Claim. (Cl. 261—98)

This invention relates to fluid contact apparatus for contacting a gas, such as air, with a liquid; and it has for its object to provide a contact bed which shall be made up of glass filaments, or the like, so arranged as not to pack under the effects of the liquid flowing through the bed nor be washed out of the bed by the liquid.

In the drawing wherein the preferred form of the invention is shown,—

Figure 2:
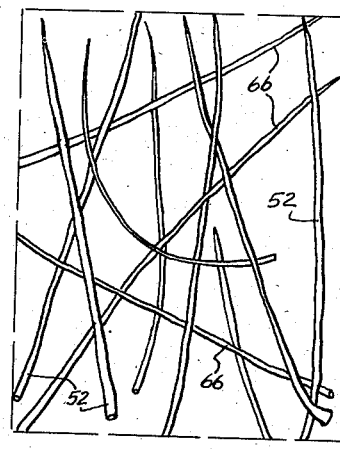

Fig. 1 is a vertical section through an air conditioning tower embodying the improved gas and liquid contact device (the latter being more or less diagrammatically shown) between the top and bottom of the tower; and Fig. 2 is a greatly enlarged view showing how the filaments, of which the improved gas and liquid contact device is composed, are arranged with respect to each other in a vertical plane looking in the direction of the arrows associated with line 2—2 of Fig. 1.

In Fig. 1, 10 indicates a tower or chamber through which the air and liquid to be contacted are passed, the improved contact bed being generally indicated at 12 and being shown as supported on a screen 14 above the bottom of the tower. The screen 14 preferably constitutes the bottom of a container 18 which is removably supported in the tower on ledges 19 secured to the inner side walls of the tower.

The air to be conditioned is forced into the lower compartment 36 of the tower by a rotary fan or blower 24 in a housing 26 whose outlet 28 opens into the compartment at one side thereof. After passing through the contact bed, the air leaves the tower through a side outlet 22 near the top of the tower. The flow of air through the tower is indicated by the arrows 16 and 20.

The liquid for contacting the air is introduced into the upper compartment 34 of the tower by a spray head or the like 32. The liquid after passing through the contact bed 12 will ordinarily be collected in a sump 38 at the bottom of the tower from which it may be withdrawn for reuse by a pump 40 in a pipeline 42, 44 and 48, the pipeline also including a suitable means 46 for reconditioning the liquid.

The tower construction as above described is to be taken as merely illustrative of the kind of environment where the improved contact bed 12 hereinafter more fully described has special utility.

In accordance with the present invention, the contact bed 12 is made up of a multiplicity of filaments or fibres arranged in a special manner and of such diameter and nature as to be self-supporting and somewhat springy or resilient. The filaments may consist of glass, wire or other material having a smooth surface and the necessary physical strength. The filaments making up the bed are all substantially parallel to a given vertical plane but are otherwise angularly disposed with respect to each other and the mass is laterally compacted in a direction perpendicular to said plane.

In order to more fully appreciate how the filaments are arranged, let us suppose that the filaments are rained down from above onto a horizontally moving belt. In such case the filaments would obviously come to rest in more or less parallelism with respect to the belt although they would extend in more or less random directions with respect to each other. The filaments are also interlaced to some extent with the result that a layer of filaments may be obtained which is sufficiently bound together by interlacement of the filaments to permit handling of the layer without incurring disintegration thereof. The interlacement of the filaments is clearly illustrated in Fig. 2, where some of the filaments are illustrated as passing above and below other filaments. By taking layers of such filaments and placing the layers on top of one another, a stack of layers of appropriate thickness may be readily built up.

In accordance with the present invention, a stack of filaments arranged in the manner described is stood on edge in the tower 10 with the result that the common plane with respect to which the filaments are substantially parallel is upright. To better express the idea, suppose that each page of a book represents a layer of crisscross filaments. If now this book is stood on edge, then it follows that the layers of filaments would be upright in the manner contemplated by the present invention.

Referring to Fig. 2, which illustrates the general appearance of a very thin layer of filaments, for instance of the thickness of two or three filaments, it will be noted that the filaments are not arranged in parallelism with respect to each other but are arranged in substantial parallelism in a vertical plane, it being noted in this connection that the view is a vertical section looking in the direction of the arrows associated with line 2—2 on Fig. 1. Some of the various filaments are indicated by reference numerals 52 and 66.

The layers of filaments which make up the contact bed 12 are stacked in the tower 10 (or in the container 18 when a container is used) fairly tightly with the result that the filaments are under considerable lateral compression. As a consequence of being under lateral compression, the filaments are not readily washed downwardly out of the bed by the liquid flowing downwardly therethrough nor will the filaments tend to pack downwardly as will now be readily understood.

As shown in Fig. 1, upright foraminous partitions 50 may be inserted in the contact bed to assist in holding the various layers of filaments upright.

I claim:

Apparatus for bringing gas and liquid into intimate contact comprising, in combination, a porous body, means for spreading liquid on top of said body, means for causing gas to flow through said body, said body consisting of a mass of relatively hard and springy filaments, said filaments being all substantially parallel to a given vertical plane, but otherwise angularly disposed with respect to each other, and the mass being compacted in a direction perpendicular to said plane.

FRANCIS R. BICHOWSKY.